US006735398B1

United States Patent
Izadpanah et al.

(10) Patent No.: US 6,735,398 B1
(45) Date of Patent: May 11, 2004

(54) GENERATING METHODS FOR SINGLE AND MULTI-CHANNEL WIDEBAND OPTICAL ANALOG PULSE POSITIONED WAVEFORMS

(75) Inventors: Hossein Izadpanah, Thousand Oaks, CA (US); Stanislav I. Ionov, Calabasas, CA (US); Robert R. Hayes, Calabasas, CA (US); George C. Valley, Los Angeles, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/526,696

(22) Filed: Mar. 15, 2000

(51) Int. Cl.[7] .............................................. H04B 10/04
(52) U.S. Cl. ...................................... 398/189; 398/183
(58) Field of Search ................................ 359/126, 161, 359/162, 172, 173, 181, 184, 186, 188, 182; 398/187, 188, 189, 198, 200, 163, 161, 185, 191; 455/102, 106

(56) References Cited

U.S. PATENT DOCUMENTS

| | | | | |
|---|---|---|---|---|
| 4,584,720 A | * | 4/1986 | Garrett | 359/186 |
| 4,648,133 A | * | 3/1987 | Vilnrotter | 359/189 |
| 5,311,351 A | * | 5/1994 | Chesnoy | 359/264 |
| 5,434,693 A | | 7/1995 | Tanaka et al. | 359/180 |
| 6,043,920 A | * | 3/2000 | Leopold et al. | 359/184 |
| 6,233,387 B1 | * | 5/2001 | Berkey et al. | 385/123 |
| 6,459,518 B1 | * | 10/2002 | Suzuki et al. | 359/156 |
| 6,486,986 B1 | * | 11/2002 | Fuse | 359/124 |

OTHER PUBLICATIONS

T. Hessler et al., "Time–resolved relaxation oscillations in gain–clamped semiconductor optical amplifiers by pump and probe measurements", Quantum Semiclass., Opt. 9 (1997), pp. 675–679.

Morton, P. A., et al., "Packaged Hybrid Soliton Pulse Source Results and 270 Terabit.km/sec Soliton Transmission", IEEE Photonics Technology Letters, vol. 7, No. 1, Jan. 1995, pp. 111–113.

S. V.Chernikov et al., "Generation of soliton pulse train in optical fibre using two CW singlemode diode lasers", Electronics Letters, May 7th, 1992, vol. 28, No. 10, pp. 931–932.

Khrushchev, I. Y., et al., "High–quality laser diode pulse compression in dispersion–imbalanced loop mirror", IEEE 1998, Electronics Letters, May 14th, 1998, vol. 34, No. 10, pp. 1009–1010.

Phillips, A. J., et al., "Novel laser intersatellite communication system employing optically preamplified PPM receivers", IEE Proc–Cmmun., vol. 142, No. 1, Feb. 1995, pp. 15–20.

(List continued on next page.)

Primary Examiner—Leslie Pascal
Assistant Examiner—Dalzid Singh
(74) Attorney, Agent, or Firm—Gates & Cooper LLP (57) ABSTRACT

A method and system for generating single and multichannel optical analog pulse-position modulation waveforms are disclosed. The system comprises a frequency modulator, a continuous wave optical source, and an optical modulator. The frequency modulator receives the analog signal and converts the analog signal into a frequency modulated signal. The optical modulator modulates the continuous wave optical source with the frequency modulated signal, to produce the optical pulse-position modulated signal. The method comprises converting an analog input signal into a frequency modulated signal amplifying the frequency modulated signal and producing a large signal therein, modulating a continuous wave optical source with the large signal, therein producing the optical pulse-position modulation signal, and compressing the optical pulse-position modulation signal, therein increasing a processing gain.

8 Claims, 7 Drawing Sheets

OTHER PUBLICATIONS

Suzuki, Masatoshi, et al., "Transform–Limited Optical Pulse Generation up to 20–GHz Repetition Rate by a Sinusoidally Driven InGaAsP Electroabsorption Modulator", Journal of Lightwave Technology, vol. 11, No. 3, Mar. 1993, pp. 468–473.

Nakazawa, Masataka, et al., "Transform–limited pulse generation in the gigahertz region from a gain–switched distributed–feedback laser diode using spectral windowing", Optics Letters, vol. 15, No. 12, Jun. 15, 1990, pp. 715–717.

Swanson, Eric A., et al., "23–GHz and 123–Hz Soliton Pulse Generation Using Two CW Lasers and Standard Single–Mode Fiber", IEEE Photonics Technology Letters, vol. 6, No. 7, Jul. 1994, pp. 796–798.

Swanson, Eric A., et al., "100–GHz Soliton Pulse Train Generation Using Soliton Compression of Two Phase Side Bands from a Single DFB Laser", IEEE Photonics Technology Letters, vol. 6, No. 10, Oct. 1994, pp. 1194–1196.

* cited by examiner

GENERATING METHODS FOR SINGLE AND MULTI-CHANNEL WIDEBAND OPTICAL ANALOG PULSE POSITIONED WAVEFORMS

BACKGROUND OF THE INVENTION

1. Field of the Invention

This invention relates in general to communications systems, and in particular generating wideband optical analog pulse positioned waveforms.

2. Description of Related Art

Communications satellites have become commonplace for use in many types of communications services, e.g., data transfer, voice communications, television spot beam coverage, and other data transfer applications. In addition to using radio frequency (RF) communications methods, optical methods are now being proposed to transfer data, because of the high data rates that optical communications links can support. Optical links have typically higher bandwidths than RF links, and can transmit data in both analog and digital formats.

Analog data transfer over optical links has been largely ignored in a digital encoding environment such as optical communications. However, many applications still require signal transfer in an analog format. Further, analog and digital optical communications links are typically degraded by noise floor factors, which is typically overcome by increasing transmitter power.

It can be seen, then, that there is a need in the art for a communications system that can transfer signals in an analog format. It can also be seen that there is a need in the art for optical communications links that can transfer signals in an analog format. It can also be seen that there is a need in the art for optical communications links that do not require increased transmitter power to overcome the limitations due to noise problems.

SUMMARY OF THE INVENTION

To overcome the limitations in the prior art described above, and to overcome other limitations that will become apparent upon reading and understanding the present specification, the present invention discloses a method and system for generating single and multi-channel optical analog pulse-position modulation (A-PPM) waveforms. The system comprises a frequency modulator, a continuous wave optical source, and an optical modulator. The frequency modulator receives the analog signal and converts the analog signal into a frequency modulated signal. The optical modulator modulates the continuous wave optical source with the frequency modulated signal, to produce the optical pulse-position modulated signal.

The method comprises converting an analog input signal into a frequency modulated signal amplifying the frequency modulated signal and producing a large signal therein, modulating a continuous wave optical source with the large signal, therein producing the optical pulse-position modulation signal, and compressing the optical pulse-position modulation signal, therein increasing a processing gain.

The present invention provides a communications system that can transfer signals in an analog format. The present invention also provides optical communications links that can transfer signals in an analog format. The present invention also provides optical communications links that do not require increased transmitter power to overcome the limitations due to noise problems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview of Related Art

Despite the proliferation of digital encoding in free-space optical communications, some applications still require transfer of signals in an analog format. A key to realizing a high-bandwidth optical inter-satellite link (OISL) is the choice of modulation format. Typical inter-satellite optical links are shot noise limited, e.g., the shot noise of the number of photons received by a telescope represents the dominant noise contribution of the system. Therefore, an increase in transmitter power is typically the only way to improve the signal-to-noise ratio (SNR) of a system employing amplitude modulation (AM) of a continuous-wave (CW) optical carrier. This represents a formidable problem for OISL, because available optical transmitting power is typically limited to a few watts. High bandwidth modulation schemes such as pulse-position modulation (PPM) present attractive alternatives to AM.

High bandwidth modulation schemes, which utilize a bandwidth higher that that of the transmitted information, may improve the SNR over that achieved with AM. One such technique is PPM, where temporal locations of individual pulses represent consecutive samples of the transmitted waveform amplitude.

Figure 1:
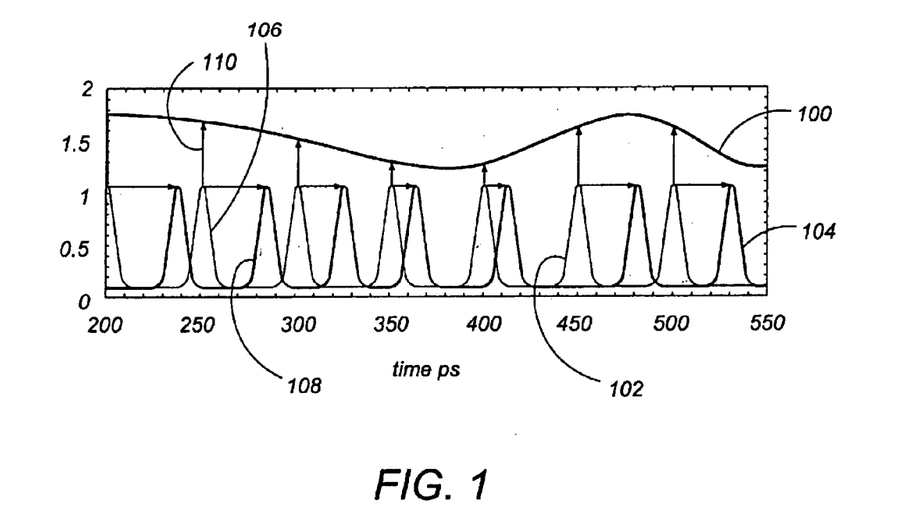
FIG. 1 illustrates a typical pulse-position modulation scheme as used in the present invention.

FIG. 1 illustrates a typical pulse-position modulation scheme as used in the present invention. As shown in FIG. 1, an analog signal 100 transforms a pulse train 102 into a pulse-position modulated signal 104 by shifting each pulse in the signal 104 from an unmodulated position in proportion to the amplitude of the analog signal. For example, unmodulated pulse 106 is shifted in time to create pulse 108 based on the amplitude 110. As amplitude 110 gets larger, pulse 108 is shifted a larger amount of time; as amplitude 110 gets smaller, pulse 108 is shifted a smaller amount of time relative to the unmodulated pulse 106 position.

Figure 2:
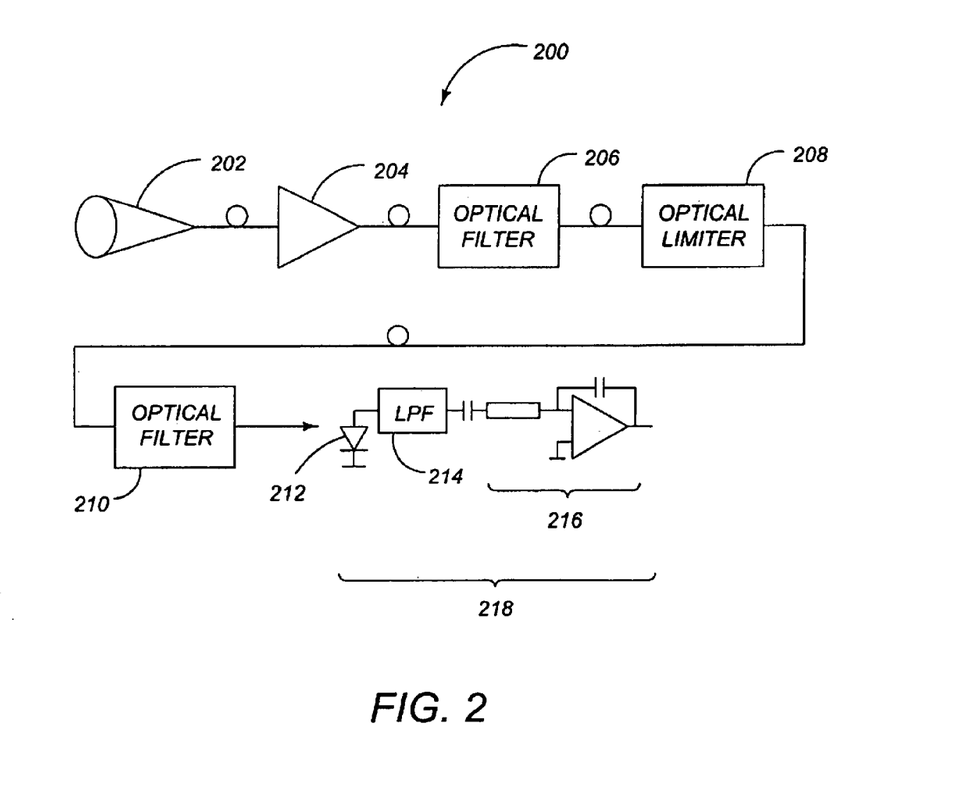
FIG. 2 illustrates a typical A-PPM receiver in accordance with the present invention.

FIG. 2 illustrates a typical PPM receiver in accordance with the present invention.

System 200 typically comprises a telescope 202, an optical amplifier 204, an optical filter 206, an optical limiter 208, an optical filter 210, a photodiode 212, a low pass filter (LPF) 214, and an integrator 216. The receiver 218 typically comprises the photodiode 212, low pass filter (LPF) 214, and integrator 216, but can also be considered to comprise the entire system 200.

Telescope 202 receives the optical signal and funnels the signal into an optical fiber, which is amplified by optical amplifier 204, and filtered by optical filter 206. The signal output from optical filter 206 can be of any amplitude, which may damage the photodetector 212 or other components in system 200, so the optical limiter 208 limits the amplitude of the optical signal or optical pulses before the signal is again filtered by optical filter 210. The optical limiter 208 also removes pulse-to-pulse amplitude fluctuations.

The photodiode 212 receives the optical pulses and converts the optical energy to electrical energy. This electrical signal is sent to LPF 214, which filters out the high-frequency components and noise. The signal is then integrated by integrator 216 to produce the analog signal from the received pulse train.

It can be shown that for a given optical power, analog PPM offers a higher SNR than AM as follows:

$$SNR_{PPM} \propto SNR_{AM}(T_S/\tau_P)^2$$

where TS and $\tau_P$ are the unmodulated pulse period and the pulse duration, respectively. With subpicosecond optical pulses, $\tau_P$=0.3 picoseconds (ps), and the pulse repetition frequency (PRF) fc=1/Ts=40 GHz, which is sufficient for transmitting up to 20 GHz of information bandwidth. This is a 33 dB sensitivity improvement over an AM modulation scheme.

As follows from the above, considerable SNR improvements can be realized in free space analog optical communications by PPM if the optical pulse can be precisely positioned on the time scale of tens of GHz. Several techniques for generating equally-spaced optical pulses of picosecond and subpicosecond duration are available, including laser mode-locking, semiconductor laser gain-switching, external modulation of a CW source, and beating two detuned CW sources against each other. Non-linear optical pulse compression techniques based on soliton effects and on self-phase modulation (SPM) with external chirp compensation are also available.

The present invention provides new implementations for generating trains of optical pulses to allow a viable system for analog PPM in optical communication. The invention proposes several embodiments, including direct modulation of a semiconductor laser with a frequency modulated waveform, a non-linear electro-absorption modulator driven by a VCO/FM generator, and beating of two FM carriers.

VCO/FM-Driven Semiconductor Laser

Figure 3A:
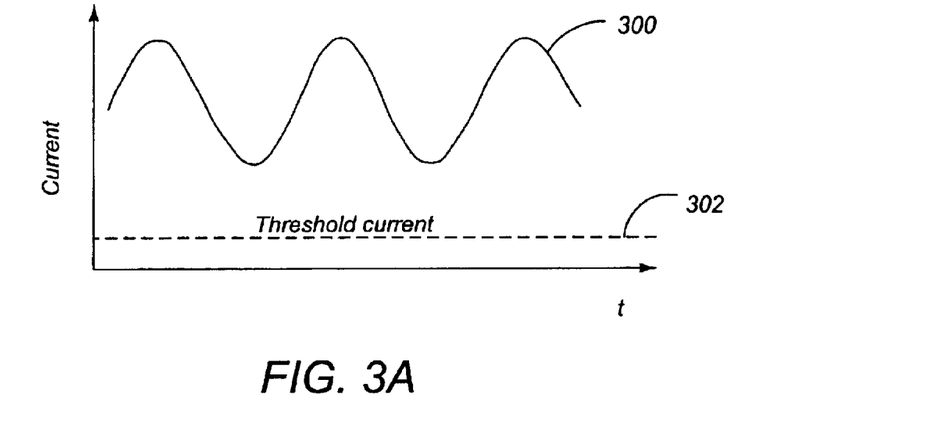
FIGS. 3A–3C illustrate the dynamics of a gain-switched semiconductor laser as used in the present invention.
Figure 3B:
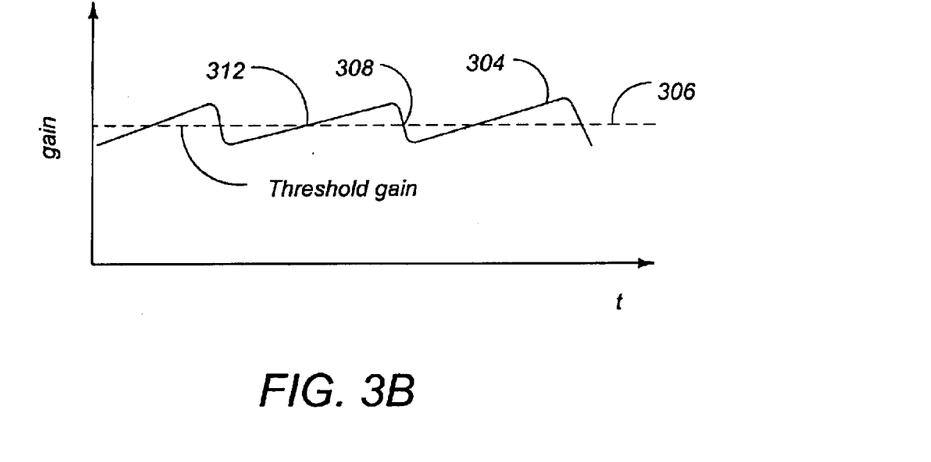
Figure 3C:
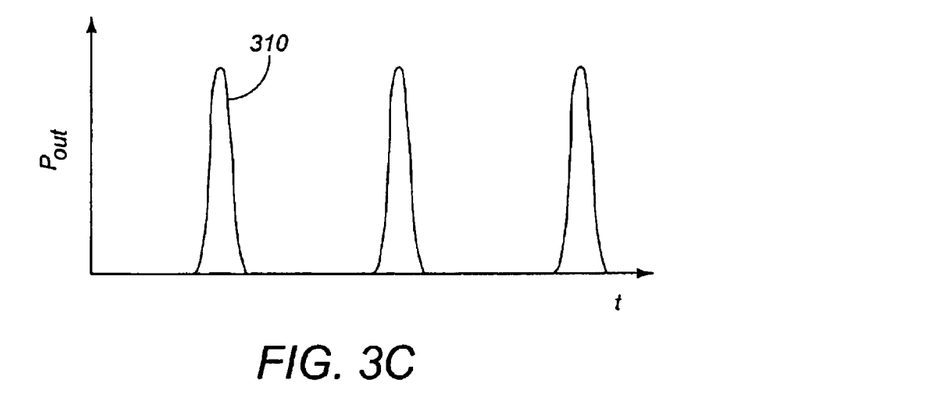

FIGS. 3A–3C illustrate the dynamics of a gain-switched semiconductor laser as used in the present invention. Gain switched semiconductor lasers are used extensively for generating trains of optical pulses. This technique produces evenly spaced trains of 3–8 picosecond (ps) pulses after the initial frequency chirp is removed.

FIG. 3A shows the input current 300 to a semiconductor laser as a function of time. The input current 300 is always above the threshold current 302 for the laser. At the same time, the gain 304 of the laser is rising and falling, typically rising above and falling below a threshold gain 306 for the laser. The gain 304 of the laser drops below the threshold gain value 306, e.g., at point 308, typically when the light intensity 310 shown in FIG. 3C is close to its maximum. As a result, the output light intensity 310 drops quickly to a very low, but non-zero, value. The gain 308 of the medium slowly rises between the pulses of the gain 304 in proportion to the energy delivered by the current 300. When gain 304 again reaches the threshold gain, e.g., at point 312, the laser intensity increases exponentially in the resonator until the gain 304 is again depleted near the top of the next light pulse 310. Such pulsation results from instabilities in laser dynamics with respect to current modulation. Importantly, the maximum PRF of a gain-switched laser is limited by the amount of energy delivered into the gain medium between consecutive pulses, and it is commonly described by the laser relaxation oscillation frequency:

$$f_r = (1/2\pi)\sqrt{\frac{(I/I_{th} - 1)}{(1/\tau_n\tau_p)}}$$

where:
$I_{th}$=threshold current,
$\tau_n$=carrier lifetime, and
$\tau_p$=photon lifetime.

Relaxation oscillation frequencies as high as 39 GHz are achieveable, which makes the present invention applicable for generating pulse trains in the tens of GHz range.

The present invention extends the technique described above to generate precisely positioned optical pulses. Two conditions based on the dynamics of a gain-switched laser must be satisfied to vary the pulse-to-pulse interval. The first condition is that a higher power must be delivered between the pulses if the interval needs to be reduced, and a lower power must be delivered between the pulses if the interval needs to be increased. These requirements originate from the need for higher resonator gains to build up to the same peak power from the low inter-pulse intensity level for a given output pulse. The second condition is that the modulation period must change accordingly with the desired pulse interval.

Figure 4:
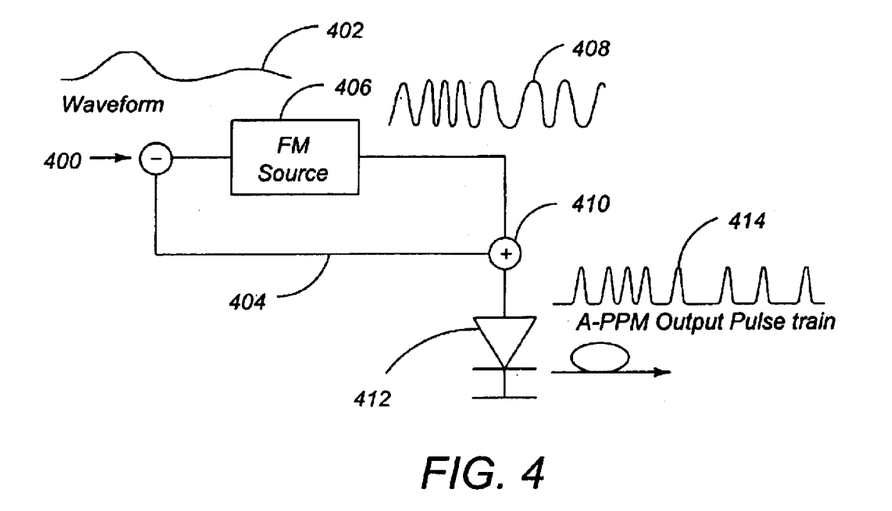
FIG. 4 illustrates a first embodiment of the present invention.

FIG. 4 illustrates a first embodiment of the present invention. To satisfy the first requirement, a fraction of input analog current 400, for a typical waveform 402, is added directly to the DC bias of a semiconductor laser, as shown in connection 404 of FIG. 4. As a result, higher power is delivered to the gain medium for higher waveform amplitudes, and lower power is delivered to the gain medium for lower waveform amplitudes. The remaining analog inputs drive a VCO or an FM modulator 406 that converts AM into FM. The central frequency of the FM waveform is centered at the required Pulse Repetition Frequency (PRF) of the unmodulated PPM train, and the frequency changes proportionally to the applied analog voltage as shown by output 408. The period of the FM output changes as the reciprocal of the frequency. This FM electrical signal is added to the laser diode current at summer 410 to synchronize the laser pulsation. The laser diode 412 then generates pulse train 414, which is an analog PPM pulse train.

Generation of PPM trains may benefit from the use of an electrical impulse generator, e.g., a step recovery diode, which produces identical electrical pulses once the input waveform reaches a threshold value. In this configuration, VCO/FM generator 406 drives a step recovery diode, which in turn drives the semiconductor laser 410. An impulse generator provides most benefits when its pulse duration is smaller than the maximum pulse extent from the unmodulated position. In this case, no additional AM modulation of laser current would be required through connection 404, since identical power is delivered to the laser by the impulse generator in each optical cycle independent of the pulse interval. The limitations of the use of impulse generators are due to the relatively long duration of electrical pulses, e.g., approximately 50 ps, which limits the application of such devices to a PRF of several GHz.

FM-driven Nonlinear Electro-Absorption (EA) Modulator

Figure 5:
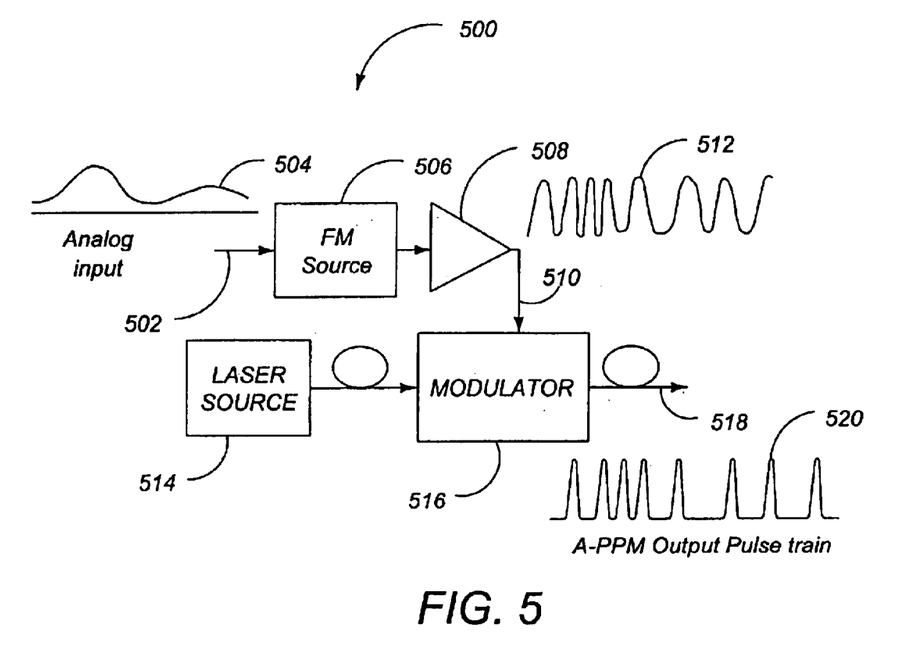
FIG. 5 illustrates another apparatus for generating A-PPM waveforms in accordance with the present invention.

FIG. 5 illustrates another apparatus for generating analog PPM waveforms in accordance with the present invention.

As shown in FIG. 5, system 500 accepts analog input 502, shown as sample waveform 504, into the FM source 506. If needed, an amplifier 508 can be used to amplify the FM signal 510, shown as waveform 512.

A continuous waveform (CW) laser source 514 is fed into an external modulator 516, where it is combined with the FM signal 510, and produces an output 518 shown as waveform 520. The modulator 516 is preferably based on electro-absorption (EA) effects, since the non-linear characteristics of an EA modulator 516 are known to produce shorter optical pulses than the duration of the applied voltage, e.g., FM signal 510. The transmission of an EA modulator 516 rises almost exponentially with voltage in the vicinity of the bandgap of the EA material. By using this technique, optical pulses in output waveform 520 of approximately 10 to 25 percent duty cycle have been generated at PRF values up to 20 GHz. With the fastest EA modulators 516, e.g., those that operate at approximately 50 GHz, 6.2 ps optical pulses can be generated at a PRF of 30 to 50 GHz. These pulses can be further shortened by using the soliton effect, or by self-phase modulation (SPM) with external compression. The advantages of this technique of the present invention include good control over pulse amplitudes while slightly limiting the application to a PRF of approximately 40 GHz.

Beating Two Laser Signals

Figure 6:
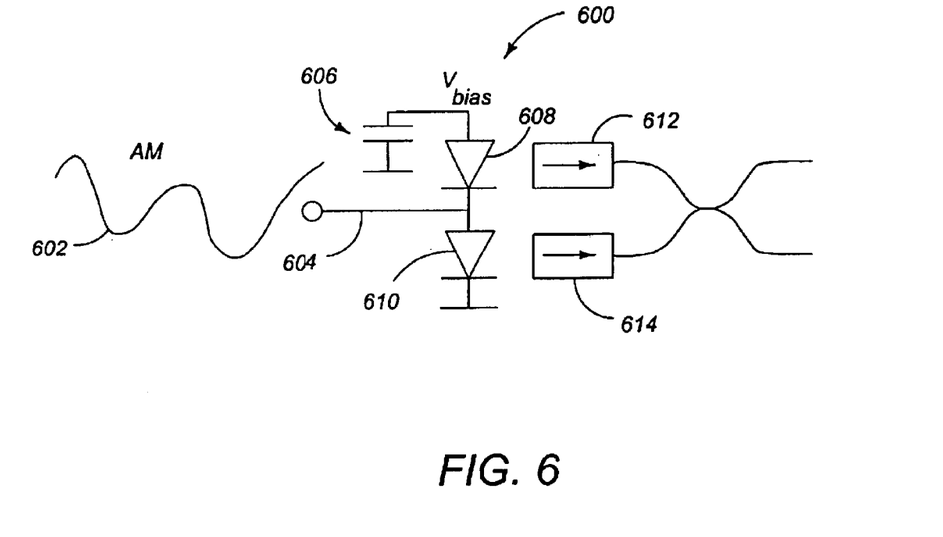
FIG. 6 illustrates generation of an A-PPM pulse train using another embodiment of the present invention.

FIG. 6 illustrates generation of a PPM pulse train using another embodiment of the present invention.

System 600 accepts input waveform 602 at input 604. A bias voltage 606 is applied to two serially connected laser diodes 608 and 610, with input 604 between the laser diodes 608 and 610. The laser diodes 608 an 610 driving current shifts the operating wavelength of the laser diodes 608 and 610 by approximately 0.3 to 1 GHz per milliamp of current. Two lasers operating at different wavelengths corresponding to the frequency shift of one-half of the required PRF will produce the desired PRF. By applying the AM input waveform 602 at the midpoint input 604, the laser diode 608 and 610 wavelengths move in opposite directions, which changes the beat period of the combined optical field in accordance with the applied input waveform 602. A 7 GHz swing in the beat frequency therefore only requires 3.5 GHz of frequency swing per laser, which is achievable with an input waveform 602 current of approximately 10 mllliamps. Laser diode 608 produces output 612 and laser diode 610 produces output 614 as shown.

Figure 7:
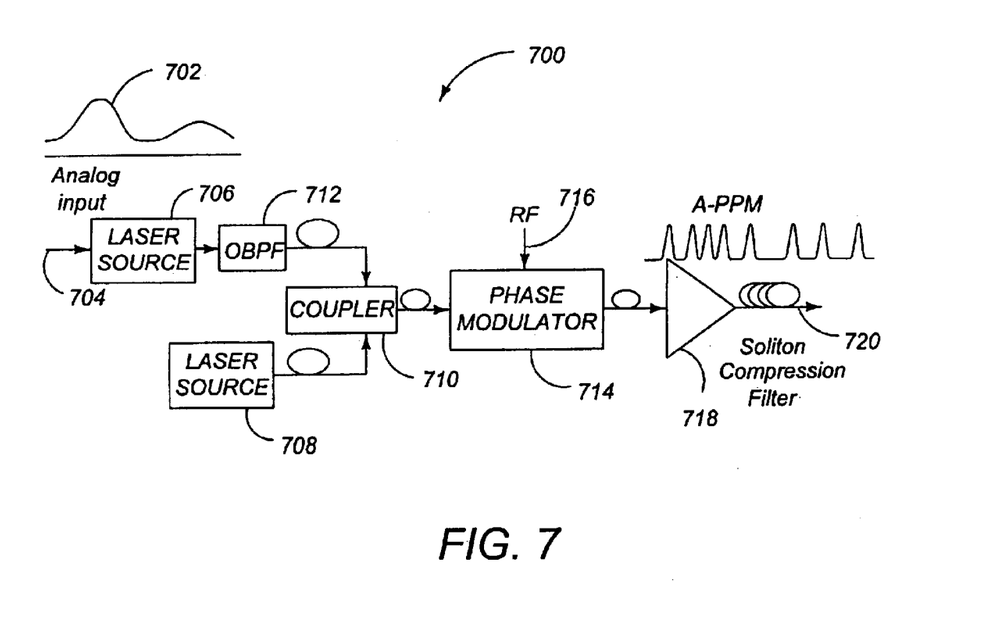
FIG. 7 illustrates generation of an analog PPM signal using another embodiment of the present invention.

FIG. 7 illustrates generation of an analog PPM signal using another embodiment of the present invention.

System 700 accepts input waveform 702 at input 704 to CW laser 706. A second CW laser source 708 is combined with CW laser source 706 output at coupler 710. The output of laser source 706 is typically bypass filtered by filter 712.

The combined output of the two laser sources 706 and 708 produces an optical beat signal at the difference frequency of the two laser sources 706 and 708 at phase modulator 714, which produces a pulse train of approximately 50 percent duty cycle.

The modulated signal is amplified at amplifier 718 and compressed to a shorter duty cycle, typically a twelve percent duty cycle, by the compression fiber 720. Compression fiber 720 is typically a soliton compression fiber. Additional phase modulation at approximately 100 MHz can also be applied to the beat signal at input 716 to suppress unwanted stimulated Brillouin scattering (SBS). Alternatively, a single laser source, say laser source 706, can be used to produce two phased sideband outputs, and these two phased sideband outputs can be beat together to produce the optical input to phase modulator 714. This scheme can produce a pulse width of 1.3 ps with a 7.2:1 duty cycle at 100 GHz.

Multi-Channel Optical Analog PPM

The present invention can also be used in a multiplexed or interleaved manner, where multiple pulse trains are interleaved, comprising an interleaving technique to increase the throughput of a free-space optical link that uses PPM of picosecond pulses to transmit analog signals. Once the analog signal is converted to PPM in a stream of picosecond pulses, a higher SNR is obtained for large excursion of very short pulses from their unmodulated position carrying the PPM information. The pulse time excursion could approach the unmodulated inter-pulse separation for maximum SNR benefits. On the other hand, the signal inter-modulation distortion (IMD) will also increase with increasing extensions of the pulse excursion. In practice, the total pulse excursion is set to 20–40 percent of the pulse interval for an acceptable IMD level. In this case, part of the interpulse time span is not used and remains idle, carrying no information. This wastes half of the available capacity of the PPM pulse train "bandwidth." The present invention can be used to interleave a second independent sequence of PPM signals into the unused part of the band, and thus increase the link capacity without further degradation of IMD of either channel. Depending on the fractional usage of the time interval for each channel, the technique can be extended to higher number of sequences sharing the interpulse time span for further capacity increase. The time interleaving of two or higher order channels are analogous to the binary phase shift keying, e.g., QPSK, 8PSK, or higher order of QAM modulation formats. This allows for more efficient use of the capacity of a train of picosecond pulses in the PPM modulation scheme.

Multi-Channel Transmitter Architecture and Operation

Figure 8:
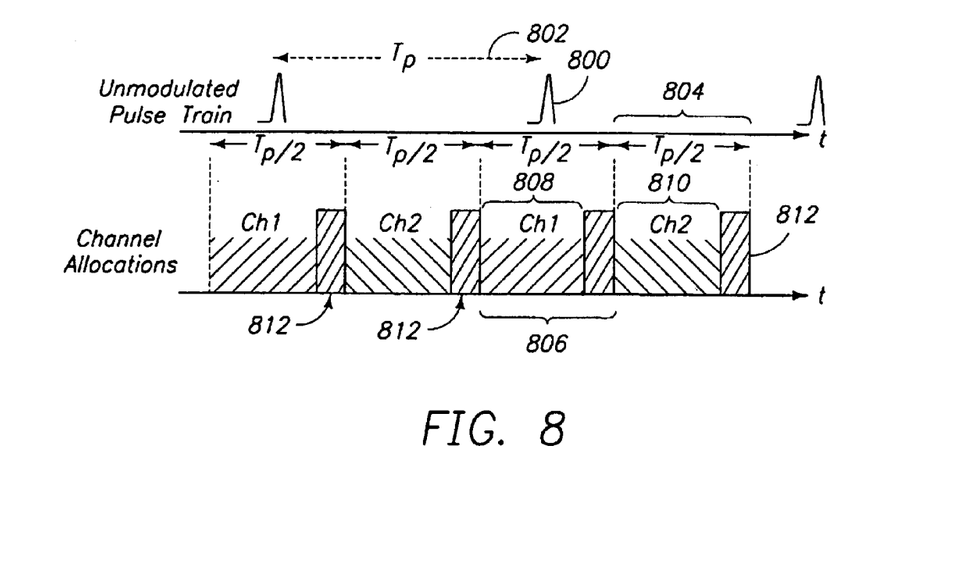
FIG. 8 illustrates a multi-channel analog PPM scheme in accordance with the present invention.

FIG. 8 illustrates a multi-channel analog PPM scheme in accordance with the present invention.

Unmodulated pulse train 800 has a period or pulse interval 802 of length Tp. As such, the majority of pulse train 800 does not have any pulses, which means that the majority of pulse train 800 does not contain any information. The present invention divides the period 802 into smaller segments 804 and 806, to allow for another pulse train 800 to be positioned in between the pulses of the original pulse train 800. As shown, the segments 804 and 806 are approximately one-half of the period 802, resulting in a two channel system. However, for a seven channel system the segments 804 and 806 would be approximately one-seventh of the total period 802.

In addition to the areas 808 and 810 that will contain pulses, guard bands 812 protect the information in one area 808 from interfering with the information in adjacent areas 810. The maximum pulse deviation for each area 808 and 810, also called channels 808 and 810, is set such that it does not overlap with the neighboring guard bands 812. For example, a guard band 812 can be designed such that the width 814 of the guard band 812 is approximately five percent of the period 802, and each channel 808 and 810 would then be 45 percent of the period 802, which allows for a channel modulation depth of +/−22.5% of the period 802 around the unmodulated pulse position.

Interleaving Multiple Signals

Figure 9:
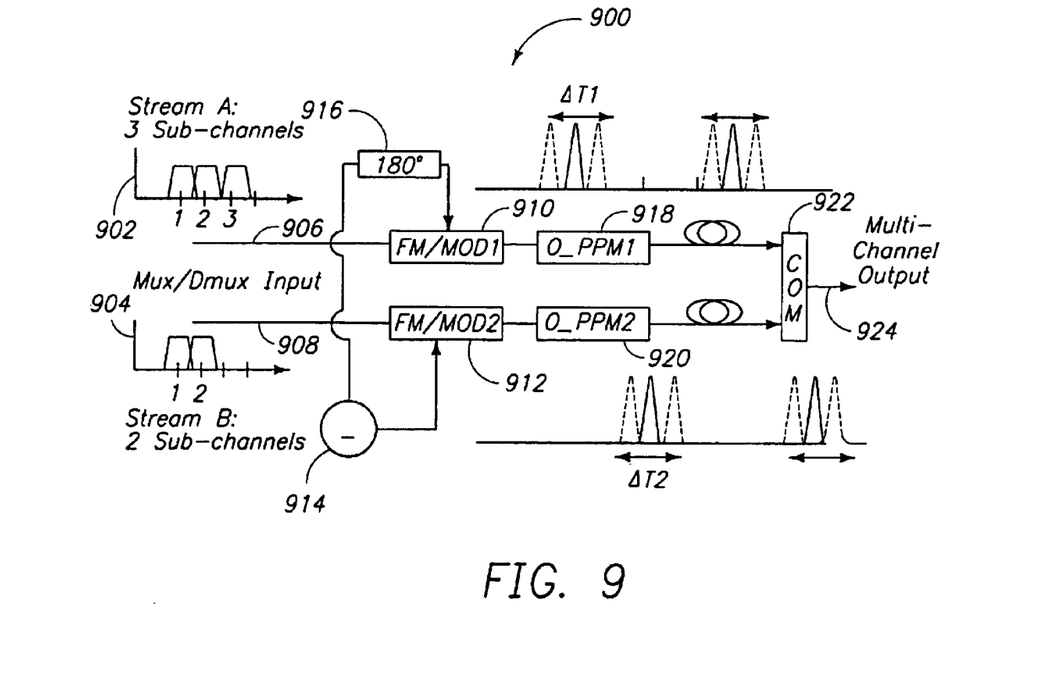
FIG. 9 illustrates the functional block diagram to interleave a two-channel PPM signal in accordance with the present invention.

FIG. 9 illustrates the functional block diagram to interleave a two-channel PPM signal in accordance with the present invention.

System 900 accepts multiple input signals 902 and 904 at inputs 906 and 908. Although two inputs 906 and 908 are shown, other numbers of inputs can be accommodated by the system 900. The signals 902 and 904 are fed into separate FM modulators 910 and 912, which are driven by a common oscillator 914 at a frequency $f_{carrier}$ with a time delay equal to half of period Tp/2 to one of the channels 906 or 908. Since the oscillator 914 produces a sinusoidal waveform, a true time delay is obtained by using a phase shifter 916 shifting the phase of one of the branches by approximately 180 degrees at the oscillator frequency. If more channels 906 and 908 are present, then the phase shift will vary depending on the number of channels 906 and 908 present. Each analog channel 906 and 908, which could have a different rate and different bandwidth, is designed to occupy, including the guard band, a certain portion of, and, in the case of two signals half of, the unmodulated pulse period Tp. The generated FM signal of each channel is converted to optical PPM in blocks 918 and 920, by the techniques described herein. The optical outputs of blocks 918 and 920 are combined at combiner 922, which produces a single output 924 of all of the channels 908 and 908. As shown in FIG. 9, signal 902 can contain a different number of subchannels than signal 904.

Multi-Channel Receiver Architecture and Operation

Figure 10:
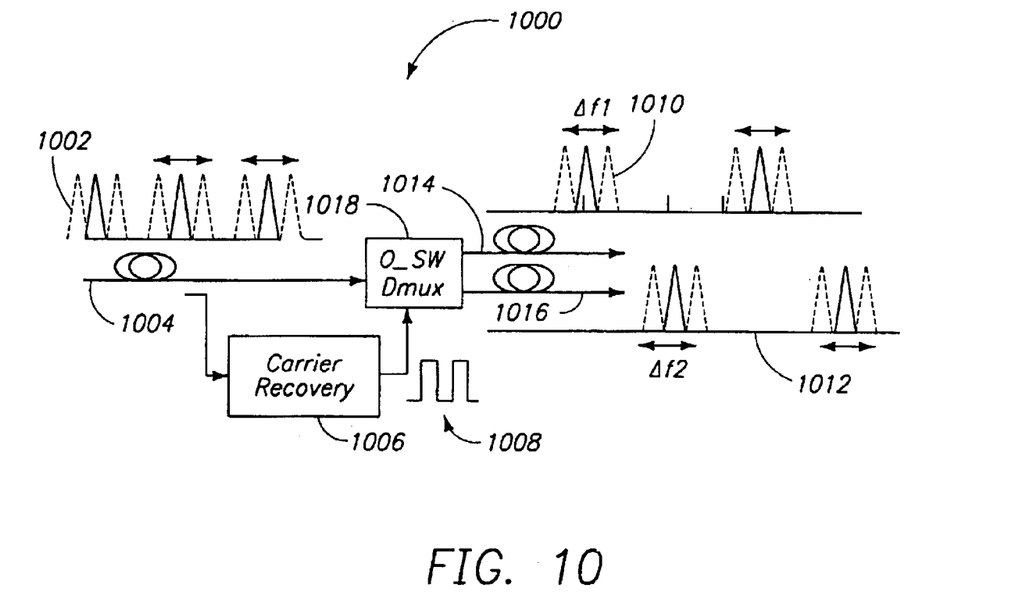
FIG. 10 illustrates a multi-channel receiver architecture embodiment in accordance with the present invention.

FIG. 10 illustrates a multi-channel receiver embodiment in accordance with the present invention. System 1000 accepts an input waveform 1002 on input 1004. Input waveform 1002 contains multiple channels of data on a single optical PPM signal. Input 1004 is fed into a carrier recovery block 1006, which recovers the clocking waveform 1008 from the input waveform 1002. This clock waveform 1008 is used to demultiplex the input waveform 1002 into the channel waveforms 1010 and 1012 which are output on outputs 1014 and 1016 from demultiplexer 1018. These waveforms 1010 and 1012 can then be passed onto individual receivers as described in FIG. 2.

Figure 11:
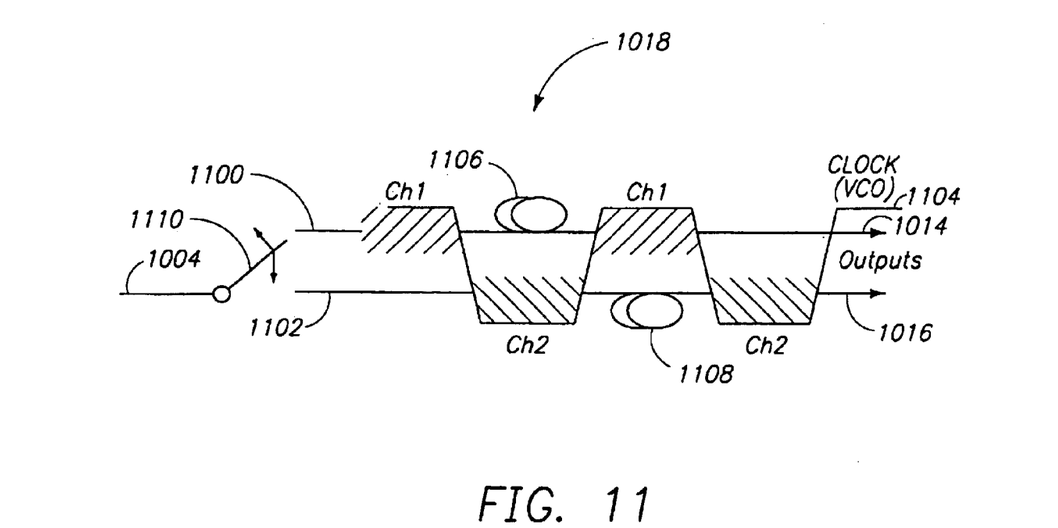
FIG. 11 illustrates a clock-data alignment for a demultiplexer to separate two A-PPM channels in accordance with the present invention.

FIG. 11 illustrates the demultiplexed channels in accordance with the present invention. Input 1004 carries multichannel information as described with respect to FIG. 10. For input 1100 to carry channel 1 information, and input 1102 to carry channel 2 information, clock 1104 must be used to switch the input 1004 into outputs 1014 and 1016. The switch 1110 must be synchronized by the clock signal 1104 to switch the input 1004 to the proper channel in a synchronized manner. The switch 1110 is typically an optical gate or switch, such as a semiconductor optical amplifier, a lithium niobate switch, or an EA, or other optical switching mechanism.

Process Chart

Figure 12:
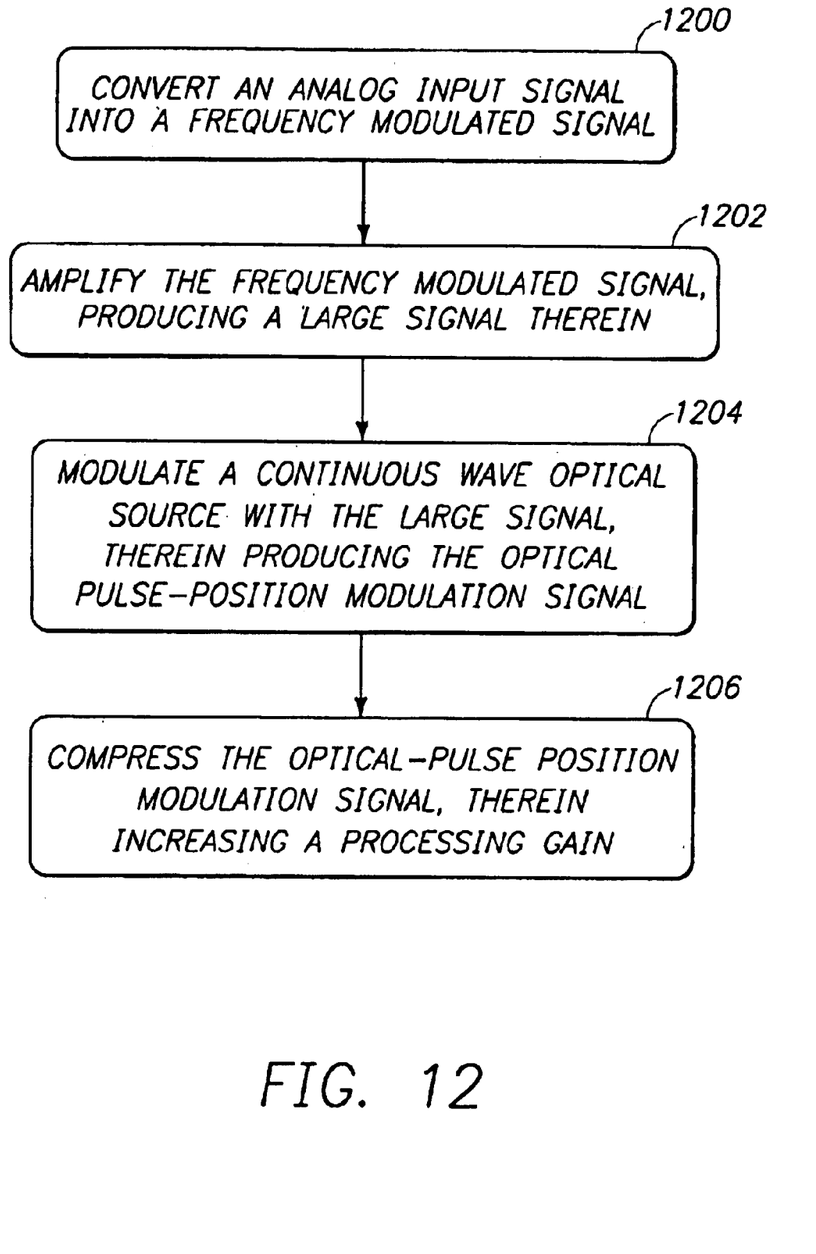
FIG. 12 is a flow chart illustrating exemplary steps used to practice the present invention.

FIG. 12 is a flow chart illustrating exemplary steps used to practice the present invention.

Block 1200 illustrates performing the step of converting an analog input signal into a frequency modulated signal.

Block 1202 illustrates performing the step of amplifying the frequency modulated signal and producing a large signal therein.

Block 1204 illustrates performing the step of modulating a continuous wave optical source with the large signal, therein producing the optical pulse-position modulation signal.

Block 1206 illustrates performing the step of compressing the optical pulse-position modulation signal, therein increasing a processing gain.

Conclusion

This concludes the description of the preferred embodiment of the invention. The following paragraphs describe some alternative methods of accomplishing the same objects. The present invention, although described with respect to two channel interleaving, can be used with three, four, or any number of channels of interleaving to produce a multi-channel signal. Further, other transmitter and receiver systems may be used with the present invention to accomplish substantially the same functions as described herein.

In summary, the present invention discloses a method and system for generating single and multi-channel optical analog pulse-position modulation waveforms. The system comprises a frequency modulator, a continuous wave optical source, and an optical modulator. The frequency modulator receives the analog signal and converts the analog signal into a frequency modulated signal. The optical modulator modulates the continuous wave optical source with the frequency modulated signal, to produce the optical pulse-position modulated signal.

The method comprises converting an analog input signal into a frequency modulated signal amplifying the frequency modulated signal and producing a large signal therein, modulating a continuous wave optical source with the large signal, therein producing the optical pulse-position modulation signal, and compressing the optical pulse-position modulation signal, therein increasing a processing gain.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for converting an analog signal comprising a plurality of channels of information into an optical pulse-position modulation signal, comprising:

a plurality of frequency modulators, each frequency modulator for receiving one of the channels of information and for converting the channels of information into a frequency modulated signal;

an oscillator;

a phase shifter, coupled to the oscillator and one of the plurality of frequency modulators, for shifting the phase of at least one of the frequency modulator signals;

a plurality of continuous wave optical sources;

a plurality of electroabsorption modulators, each electroabsorption modulator for modulating the one of the plurality of continuous wave optical sources with one of the frequency modulated signals; and a combiner, for combining an output of the plurality of electroabsorption modulators into a multi-channel output signal.

2. The system of claim 1, wherein the continuous wave optical source is a laser.

3. The system of claim 1, further comprising an amplifier, coupled between the frequency modulator and the optical modulator, for amplifying the frequency modulated signal.

4. The system of claim 1, wherein the analog signal is an electrical signal.

5. An analog optical pulse-position modulation communications signal generated by performing the steps of:

converting an analog input signal comprising a plurality of channels of information into a plurality of frequency modulated signals, each having a channel of information of the plurality of channels of information to produce at least two frequency modulated signals;

shifting a phase of at least one of the frequency modulated signals to produce at least one phase shifted frequency modulated signal;

non-linearly modulating a first continuous wave optical source with the at least one phase shifted frequency modulated signal; and non-linearly modulating a second continuous wave optical source with at least one of the two frequency modulated signals.

6. The signal of claim 5, wherein the signal is generated by performing steps further comprising the step of:

amplifying at least one of the frequency modulated signals.

7. A method for communicating using an analog optical pulse-position modulation signal, comprising:

converting an analog input signal comprising a plurality of channels of information into a plurality of frequency modulated signals, each having a channel of information of the plurality of channels of information to produce at least two frequency modulated signals;

shifting a phase of at least one of the frequency modulated signals to produce at least one phase shifted frequency modulated signal;

non-linearly modulating a first continuous wave optical source with the at least one phase shifted frequency modulated signal;

non-linearly modulating a second continuous wave optical source with at least one of the two frequency modulated signals; and transmitting the optical pulse-position modulation signal to a receiver.

8. The method of claim 7, further comprising the step of:

amplifying at least one of the frequency modulated signals.

* * * * *